(12) United States Patent
Tsai et al.

(10) Patent No.: US 8,285,511 B2
(45) Date of Patent: Oct. 9, 2012

(54) METHOD AND APPARATUS FOR ESTIMATING TEMPERATURE OF TEST POINT IN SPACE WITH AIR CONDITIONER

(75) Inventors: Kun-Cheng Tsai, Taipei (TW); Chang-An Hsieh, Taipei (TW); Pei-Lin Hou, Taipei County (TW); Chia-Shin Yen, Taipei County (TW)

(73) Assignee: Institute for Information Industry, Taipei (TW)

( * ) Notice: Subject to any disclaimer, the term of this patent is extended or adjusted under 35 U.S.C. 154(b) by 381 days.

(21) Appl. No.: 12/624,425

(22) Filed: Nov. 24, 2009

(65) Prior Publication Data

US 2011/0106315 A1 May 5, 2011

(30) Foreign Application Priority Data

Oct. 29, 2009 (TW) .............................. 98136683 A (51) Int. Cl.
*G05D 23/00* (2006.01)
*G06F 17/40* (2006.01)
(52) U.S. Cl. .......... 702/130; 702/136; 702/99; 700/278; 374/142

(58) Field of Classification Search ................... 702/130, 702/136, 99
See application file for complete search history.

(56) References Cited

U.S. PATENT DOCUMENTS

| 5,187,943 | A  | * | 2/1993  | Taniguchi et al. | 62/180 |
| 5,659,554 | A  | * | 8/1997  | Okayasu | 714/738 |
| 7,610,910 | B2 | * | 11/2009 | Ahmed | 126/595 |

* cited by examiner

*Primary Examiner* — Hal Wachsman
(74) *Attorney, Agent, or Firm* — Jianq Chyun IP Office (57) ABSTRACT

A method and an apparatus for estimating temperature are provided for estimating a temperature of a test point in a space with an air conditioner. In the method, a first and a second sensor device are deployed in the space, wherein the second sensor device is deployed at the test point. Then, state parameters and temperature transformation functions are defined according to temperatures detected by the first and the second sensor devices and a state of the air conditioner during a predetermined time period. After the second sensor device is removed, a current state of the air conditioner is determined by reference temperatures detected by the first sensor device and the state parameters. One of the temperature transformation functions is selected according to the current state, and a current temperature of the test point is estimated by using the selected temperature transformation function and the reference temperatures.

22 Claims, 4 Drawing Sheets

METHOD AND APPARATUS FOR ESTIMATING TEMPERATURE OF TEST POINT IN SPACE WITH AIR CONDITIONER

CROSS-REFERENCE TO RELATED APPLICATION

This application claims the priority benefit of Taiwan application serial no. 98136683, filed on Oct. 29, 2009. The entirety of the above-mentioned patent application is hereby incorporated by reference herein and made a part of specification.

BACKGROUND OF THE INVENTION

1. Field of the Invention

The present invention relates to a method for estimating a temperature. More particularly, the present invention relates to a method for estimating a temperature of a place where a sensor device can not be easily deployed, and applications thereof.

2. Description of Related Art

With shortages of petroleum, electric power and other nature resources, energy crisis has become an issue that the whole world has to face to. In an energy crisis era, besides seeking more alternative energies, to effectively use existing resources and avoid wasting are very important approaches to deal with such crisis.

A concept of construction energy saving is to reduce an amount of energy dissipation according to appearance and internal designs of a construction, so as to improve an energy usage efficiency of the construction. In a general construction, air conditioning and an illumination system may consume a lot of energy. Therefore, in a green construction design based on the construction energy saving concept, a plurality of sensors are deployed to obtain environment information, so as to adjust the air conditioning and the illumination system according to environment states, and to achieve a purpose of power-saving.

However, considering user's habits and space aesthetics, the sensors are generally deployed on walls or underneath ceilings. Therefore, deployment positions of the sensors are quite different to actual activity positions of the user in the space. According to statistics, there are two degrees of temperature difference between the ceiling and a desktop under it. Therefore, when an air conditioning system is adjusted according to an obtained value of the sensor deployed on the ceiling, the user may feel excessive hot or cold due to that the sensor is unable to reflect an actual feeling of the user, and the air conditioning system is liable to consume excessive unnecessary power.

SUMMARY OF THE INVENTION

The present invention is directed to a method for estimating a temperature, by which a temperature of a test point in a space can be estimated by using a sensor device deployed at another place.

The present invention is directed to a temperature estimating apparatus, which can be applied in various environments to estimate a temperature of a test point.

The present invention provides a method for estimating a temperature to estimate a temperature of a test point in a space with air conditioning. In the present method, a first sensor device and a second sensor device are deployed in the space, wherein the second sensor device is deployed at the test point. Then, a plurality of state parameters are calculated and a plurality of temperature transformation functions are established according to a plurality of previous temperatures detected by the first and the second sensor devices and a previous state of an air conditioner during a predetermined time period. After the second sensor device is removed, a current state of the air conditioner is determined according to a plurality of reference temperatures newly detected by the first sensor device and the state parameters. Then, one of the temperature transformation functions is selected according to the current state, and a current temperature of the test point is estimated by using the selected temperature transformation function and the reference temperatures.

In an embodiment of the present invention, the step of calculating the state parameters includes the following steps. First, the temperatures detected when the previous state of the air conditioner is a running state are obtained from the previous temperatures to calculate a running temperature average and a running temperature standard deviation. Next, the temperatures detected when the previous state of the air conditioner is a closing state are obtained from the previous temperatures to calculate a closing temperature average and a closing temperature standard deviation. Next, one of the running temperature average and the closing temperature average is defined as a temperature high standard, and another one is defined as a temperature low standard. The running temperature standard deviation, the closing temperature standard deviation, the temperature high standard and the temperature low standard serve as four of the state parameters.

In an embodiment of the present invention, the step of calculating the state parameters further includes the following steps. First, the temperatures detected when the previous state of the air conditioner is a closing transition state are obtained from the previous temperatures to calculate a first temperature variation rate. Next, the temperatures detected when the previous state of the air conditioner is a running transition state are obtained from the previous temperatures to calculate a second temperature variation rate. Next, the first temperature variation rate and the second temperature variation rate serve as two of the state parameters.

In an embodiment of the present invention, the step of establishing the temperature transformation functions includes the following steps. First, a function model of the temperature transformation functions is defined. Next, corresponding relationships respectively between the temperature transformation functions and the running state, the closing state, the closing transition state and the running transition state are set. Next, the temperatures detected when the air conditioner is in the running state are obtained from the previous temperatures, and are input to the function model to establish the temperature transformation function corresponding to the running state. Next, the temperatures detected when the air conditioner is in the closing state are obtained from the previous temperatures, and are input to the function model to establish the temperature transformation function corresponding to the closing state. Next, the temperatures detected when the air conditioner is in the closing transition state are obtained from the previous temperatures, and are input to the function model to establish the temperature transformation function corresponding to the closing transition state. Next, the temperatures detected when the air conditioner is in the running transition state are obtained from the previous temperatures, and are input to the function model to establish the temperature transformation function corresponding to the running transition state.

In an embodiment of the present invention, the step of determining the current state of the air conditioner includes determining an initial state according to the reference temperatures, the temperature high standard, the temperature low standard, the running temperature standard deviation and the closing temperature standard deviation, and determining the current state according to the initial state, the reference temperatures, the first temperature variation rate and the second temperature variation rate.

In an embodiment of the present invention, the step of determining the initial state includes the following steps. First, a reference average and a reference standard deviation are calculated according to the reference temperatures. Next, if the reference average is greater than the temperature high standard, the initial state is determined to be the closing state when the temperature high standard is equal to the closing temperature average, and the initial state is determined to be the running state when the temperature high standard is equal to the running temperature average. Next, if the reference average is less than or equal to the temperature low standard, the initial state is determined to be the running state when the temperature low standard is equal to the running temperature average, and the initial state is determined to be the closing state when the temperature low standard is equal to the closing temperature average. However, if the reference average is between the temperature high standard and the temperature low standard, the initial state is determined to be the closing state when the reference standard deviation is closed to the closing temperature standard deviation, and the initial state is determined to be the running state when the reference standard deviation is closed to the running temperature standard deviation.

In an embodiment of the present invention, before the step of determining the current state, the method further includes the following steps. First, a reference variation rate is calculated according to the reference temperatures. Next, a first condition that the reference variation rate is greater than the first temperature variation rate and the first temperature variation rate is greater than 0 is defined. Next, a second condition that the reference variation rate is greater than the second temperature variation rate and the second temperature variation rate is greater than 0 is defined. The step of determining the current state includes following steps. First, when the initial state or the current state is the running state, it is determined whether the first condition is satisfied, and if the first condition is not satisfied, the current state is determined to be maintained to the running state, and if the first condition is satisfied, the current state is determined to enter the closing transition state. Next, when the initial state or the current state is the closing state, it is determined whether the second condition is satisfied, and if the second condition is not satisfied, the current state is determined to be maintained to the closing state, and if the second condition is satisfied, the current state is determined to enter the running transition state. Next, when the current state is the closing transition state, it is determined whether the first condition is satisfied, and if the first condition is satisfied, the current state is determined to be maintained to the closing transition state, and if the first condition is not satisfied, the current state is determined to enter the closing state. Next, when the current state is the running transition state, it is determined whether the second condition is satisfied, and if the second condition is satisfied, the current state is determined to be maintained to the running transition state, and if the second condition is not satisfied, the current state is determined to enter the running state.

In an embodiment of the present invention, the step of selecting one of the temperature transformation functions according to the current state includes selecting the temperature transformation function corresponding to the current state according to the corresponding relationships respectively between the temperature transformation functions and the running state, the closing state, the closing transition state and the running transition state.

In an embodiment of the present invention, the step of estimating the current temperature of the test point according to the selected temperature transformation function and the reference temperatures includes inputting a latest reference temperature of the reference temperatures to the selected temperature transformation function to obtain the current temperature.

In an embodiment of the present invention, the second sensor device includes one or a plurality of sensors.

The present invention provides a temperature estimating apparatus including a learning module and an estimating module coupled to the learning module. The learning module calculates a plurality of state parameters and establishes a plurality of temperature transformation functions according to a plurality of previous temperatures detected by a first and a second sensor devices deployed in a space and a previous state of an air conditioner during a predetermined time period, wherein the second sensor device is deployed at a test point in the space. After the second sensor device is removed from the space, the estimating module determines a current state of the air conditioner according to a plurality of reference temperatures newly detected by the first sensor device and the state parameters, and selects one of the temperature transformation functions according to the current state, and estimates a current temperature of the test point according to the selected temperature transformation function and the reference temperatures.

In an embodiment of the present invention, the learning module obtains the temperatures detected when the previous state of the air conditioner is a running state from the previous temperatures to calculate a running temperature average and a running temperature standard deviation. The learning module further obtains the temperatures detected when the previous state of the air conditioner is a closing state from the previous temperatures to calculate a closing temperature average and a closing temperature standard deviation. The learning module defines one of the running temperature average and the closing temperature average as a temperature high standard, and defines another one as a temperature low standard, and takes the running temperature standard deviation, the closing temperature standard deviation, the temperature high standard and the temperature low standard as four of the state parameters.

In an embodiment of the present invention, the learning module obtains the temperatures detected when the previous state of the air conditioner is a closing transition state from the previous temperatures to calculate a first temperature variation rate, and obtains the temperatures detected when the previous state of the air conditioner is a running transition state from the previous temperatures to calculate a second temperature variation rate. The learning module takes the first temperature variation rate and the second temperature variation rate as two of the state parameters.

In an embodiment of the present invention, the learning module defines a function model of the temperature transformation functions, and sets corresponding relationships respectively between the temperature transformation functions and the running state, the closing state, the closing transition state and the running transition state. The learning module obtains the temperatures detected when the air conditioner is in the running state from the previous temperatures, and inputs the temperatures to the function model to establish the temperature transformation function corresponding to the running state. The learning module obtains the temperatures detected when the air conditioner is in the closing state from the previous temperatures, and inputs the temperatures to the function model to establish the temperature transformation function corresponding to the closing state. The learning module obtains the temperatures detected when the air conditioner is in the closing transition state from the previous temperatures, and inputs the temperatures to the function model to establish the temperature transformation function corresponding to the closing transition state. The learning module obtains the temperatures detected when the air conditioner is in the running transition state from the previous temperatures, and inputs the temperatures to the function model to establish the temperature transformation function corresponding to the running transition state.

In an embodiment of the present invention, the estimating module determines an initial state according to the reference temperatures, the temperature high standard, the temperature low standard, the running temperature standard deviation and the closing temperature standard deviation, and determines the current state according to the initial state, the reference temperatures, the first temperature variation rate and the second temperature variation rate.

In an embodiment of the present invention, the estimating module calculates a reference average and a reference standard deviation according to the reference temperatures. If the reference average is greater than the temperature high standard, the estimating module determines that the initial state is the closing state when the temperature high standard is equal to the closing temperature average, and determines that the initial state is the running state when the temperature high standard is equal to the running temperature average. If the reference average is less than or equal to the temperature low standard, the estimating module determines that the initial state is the running state when the temperature low standard is equal to the running temperature average, and determines that the initial state is the closing state when the temperature low standard is equal to the closing temperature average. If the reference average is between the temperature high standard and the temperature low standard, the estimating module determines that the initial state is the closing state when the reference standard deviation is closed to the closing temperature standard deviation, and determines that the initial state is the running state when the reference standard deviation is closed to the running temperature standard deviation.

In an embodiment of the present invention, the estimating module calculates a reference variation rate according to the reference temperatures, and defines a first condition that the reference variation rate is greater than the first temperature variation rate and the first temperature variation rate is greater than 0, and further defines a second condition that the reference variation rate is greater than the second temperature variation rate and the second temperature variation rate is greater than 0. When the initial state or the current state is the running state, the estimating module determines whether the first condition is satisfied, and further determines that the current state is maintained to the running state if the first condition is not satisfied, and determines that the current state enters the closing transition state if the first condition is satisfied. When the initial state or the current state is the closing state, the estimating module determines whether the second condition is satisfied, and further determines that the current state is maintained to the closing state if the second condition is not satisfied, and determines that the current state enters the running transition state if the second condition is satisfied. When the current state is the closing transition state, the estimating module determines whether the first condition is satisfied, and further determines that the current state is maintained to the closing transition state if the first condition is satisfied, and determines that the current state enters the closing state if the first condition is not satisfied. When the current state is the running transition state, the estimating module determines whether the second condition is satisfied, and further determines that the current state is maintained to the running transition state if the second condition is satisfied, and determines that the current state enters the running state if the second condition is not satisfied.

In an embodiment of the present invention, the estimating module selects the temperature transformation function corresponding to the current state according to the corresponding relationships respectively between the temperature transformation functions and the running state, the closing state, the closing transition state and the running transition state.

In an embodiment of the present invention, the estimating module inputs a latest reference temperature of the reference temperatures to the selected temperature transformation function to obtain the current temperature.

In an embodiment of the present invention, the second sensor device includes one or a plurality of sensors.

According to the above descriptions, in the present invention, the operation of estimating the temperature is divided into a learning stage and an actual estimating stage. In the learning stage, a plurality of the temperature transformation functions is established according to correlations of reading values of the two sensor devices and the state of the air conditioner. In the actual estimating stage, only the information provided by one sensor device is required to determine the state of the air conditioner, and a suitable temperature transformation function is correspondingly selected to estimate the current temperature of the test point.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
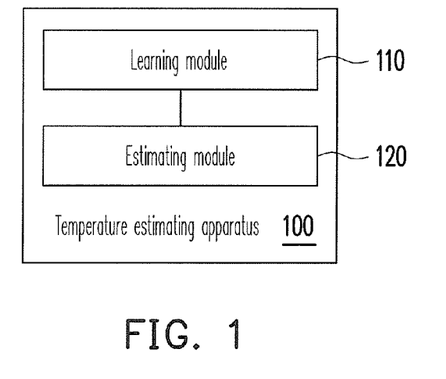
FIG. 1 is a block diagram illustrating a temperature estimating apparatus according to an embodiment of the present invention.

FIG. 1 is a block diagram illustrating a temperature estimating apparatus according to an embodiment of the present invention. Referring to FIG. 1, the temperature estimating apparatus 100 is used for estimating a temperature of a certain test point in a space with an air conditioner. The space can be an indoor space or an open space, which is not limited by the present invention. The air conditioner can be an air-cooling device or a heater. For simplicity's sake, the air conditioner is assumed to the air-cooling device.

As that shown in FIG. 1, the temperature estimating apparatus 100 includes a learning module 110 and an estimating module 120 coupled to the learning module 110. The learning module 110 and the estimating module 120 are, for example, hardware devices (for example, chip sets) or software components computing and processing, or a combination of a hardware device and a software component.

Figure 2:
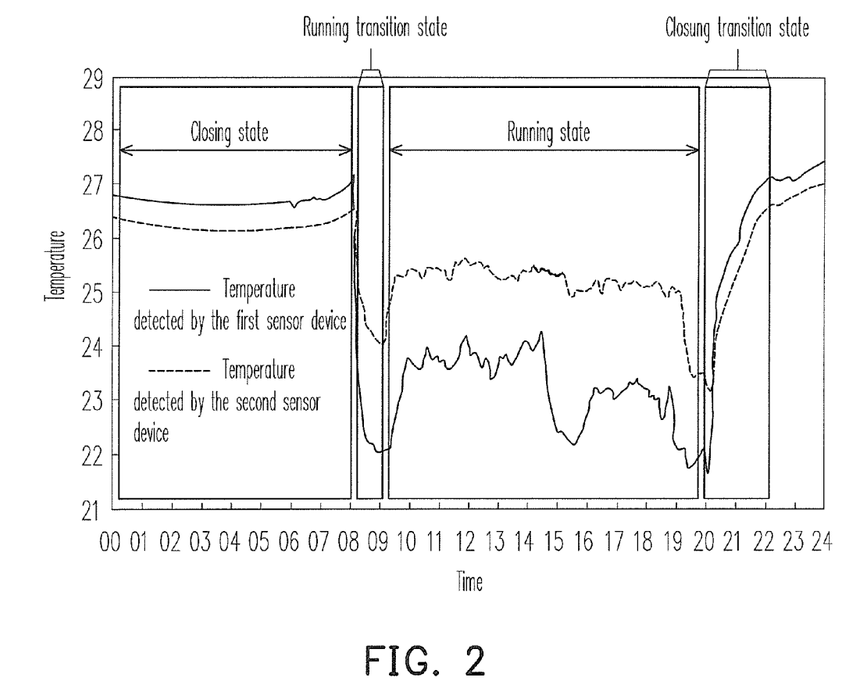
FIG. 2 is a schematic diagram illustrating temperatures respectively detected by two sensor devices under various states of an air conditioner according to an embodiment of the present invention.

In the present embodiment, a first sensor device is deployed at a specific position in the space, and a second sensor device (which may include one or a plurality of sensors) is deployed at the test point. Since the temperatures respectively detected by the first sensor device and the second sensor device may have different corresponding relations under different states of the air conditioner (shown in FIG. 2), the learning module 110 can define a plurality of state parameters and a plurality of temperature transformation functions according to a plurality of previous temperatures detected by the first and the second sensor devices and a corresponding previous state of the air conditioner during a predetermined time period. It should be noticed that the predetermined time period can be a relatively long time period (for example, one day), and the learning module 110 can obtain a plurality of reading values of the first sensor device and the second sensor device in case that the air conditioner is actually operated. Moreover, during a relatively short time period (for example, 3 hours), the air conditioner can be manually adjusted to various states, and the learning module 110 can obtain a plurality of reading values of the first sensor device and the second sensor device within the relatively short time period.

After the second sensor device is removed from the space, and only the first sensor device is remained, the temperature of the test point cannot be directly detected through the second sensor device. Now, the estimating module 120 determines a current state of the air conditioner according to temperature information provided by the first sensor device and the state parameters generated by the learning module 110, so as to select a corresponding temperature transformation function. Then, the temperature information provided by the first sensor device is input to the selected temperature transformation function to estimate a current temperature of the test point.

Figure 3:
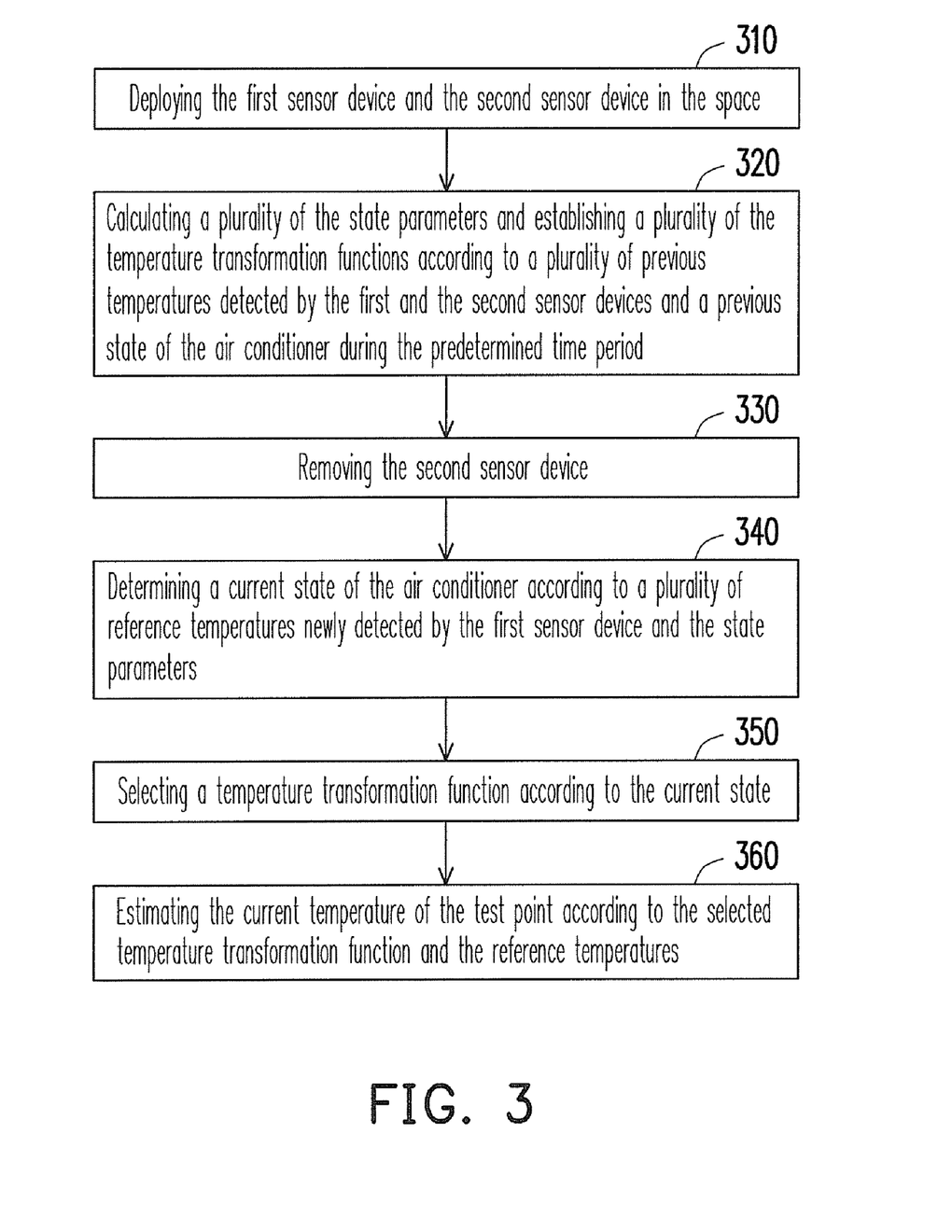
FIG. 3 is a flowchart illustrating a method for estimating a temperature according to an embodiment of the present invention.

Another embodiment is provided below to further describe a detailed operation flow of the temperature estimating apparatus 100. FIG. 3 is a flowchart illustrating a method for estimating a temperature according to an embodiment of the present invention. The present embodiment is described with reference of FIG. 1 and FIG. 3.

First, in step 310, the first sensor device and the second sensor device are deployed in the space, wherein the first sensor device is, for example, deployed on a ceiling in the space, and the second sensor device is deployed at the test point. In the present embodiment, the test point can be a desktop or other positions representing an activity range of a user.

Next, in step 320, the learning module 110 calculates a plurality of the state parameters and establishes a plurality of the temperature transformation functions according to a plurality of previous temperatures detected by the first and the second sensor devices and a previous state of the air conditioner during the predetermined time period.

In detail, since the air conditioner is cycled among a closing state, a running transition state, a running state and a closing transition state, the learning module 110 obtains the temperatures detected by the first and the second sensor devices when the previous state of the air conditioner is the running state from the previous temperatures detected during the predetermined time period, so as to calculate a running temperature average and a running temperature standard deviation.

The learning module 110 also obtains the temperatures detected by the first and the second sensor devices when the previous state of the air conditioner is the closing state from the previous temperatures detected during the predetermined time period, so as to calculate a closing temperature average and a closing temperature standard deviation.

In the present embodiment, the learning module 110 defines one of the running temperature average and the closing temperature average as a temperature high standard, and defines another one as a temperature low standard. For example, the learning module 110 first compares the running temperature average and the closing temperature average, and then defines a greater one of the running temperature average and the closing temperature average as the temperature high standard, and defines a smaller one as the temperature low standard.

Moreover, the learning module 110 obtains the temperatures detected when the previous state of the air conditioner is the closing transition state from the previous temperatures detected during the predetermined time period, so as to calculate a first temperature variation rate. The learning module 110 also obtains the temperatures detected when the previous state of the air conditioner is the running transition state from the previous temperatures, so as to calculate a second temperature variation rate. For example, the first temperature variation rate and the second temperature variation rate are calculated according to a following equation:

$$\frac{\max(T) - \min(T)}{N}$$

Where, max(T) represents a maximum value of the previous temperatures detected during a time period, min(T) represents a minimum value of the previous temperatures detected during such time period, and N represents a number of the previous temperatures detected during such time period. Though, the above equation is only an example, which is not used to limit the present invention.

In the present embodiment, the learning module 110 takes the calculated running temperature standard deviation, the closing temperature standard deviation, the temperature high standard, the temperature low standard, the first temperature variation rate and the second temperature variation rate as the state parameters.

To establish the temperature transformation functions, the learning module 110 first defines a function model of the temperature transformation functions. The function model is, for example, a quadratic regression equation or a weighted average equation, etc. Then, the learning module 110 sets corresponding relationships respectively between the temperature transformation functions and the running state, the closing state, the closing transition state and the running transition state. Namely, in the present embodiment, the learning module 110 sets four temperature transformation functions respectively corresponding to the running state, the closing state, the closing transition state and the running transition state of the air conditioner.

The learning module 110 obtains the temperatures detected when the air conditioner is in the running state from the previous temperatures, and inputs the temperatures to the function model to establish the temperature transformation function corresponding to the running state. Moreover, the learning module 110 also obtains the temperatures detected when the air conditioner is in the closing state from the previous temperatures, and inputs the temperatures to the function model to establish the temperature transformation function corresponding to the closing state. The learning module 110 also obtains the temperatures detected when the air conditioner is in the closing transition state from the previous temperatures, and inputs the temperatures to the function model to establish the temperature transformation function corresponding to the closing transition state. Moreover, the learning module 110 obtains the temperatures detected when the air conditioner is in the running transition state from the previous temperatures, and inputs the temperatures to the function model to establish the temperature transformation function corresponding to the running transition state.

The function model defined by the learning module 110 is, for example, a following quadratic equation:

$$T_d = a \times T_{top}^2 + b \times T_{top} + c$$

Where, $T_{top}$ and $T_d$ respectively represent the temperatures detected by the first sensor device and the second sensor device, and a, b and c are coefficients of the equation. For example, when the learning module 110 establishes the temperature transformation function corresponding to the running state, the learning module 110 first obtains a plurality of the previous temperatures detected by the first and the second sensor devices under the running state. Then, the learning module 110 obtains the values of the coefficients a, b and c from the above previous temperatures according to a linear regression approach. After the coefficients a, b and c are input to the quadratic equation, the temperature transformation function corresponding to the running state is established. Since establishments of the temperature transformation functions of the other three states are the same or similar to the above example, so that detailed descriptions thereof are not repeated.

Next, in step 330, the second sensor device originally deployed at the test point is removed from the space, and only the first sensor device is remained. Now, the temperature estimating apparatus 100 can only receive the temperature information detected by the first sensor device.

Next, when the temperature of the test point is estimated, in step 340, the estimating module 120 determines a current state of the air conditioner according to a plurality of reference temperatures newly detected by the first sensor device and the state parameters calculated by the learning module 110. In the present embodiment, the estimating module 120 first determines an initial state according to the reference temperatures, the temperature high standard, the temperature low standard, the running temperature standard deviation and the closing temperature standard deviation, and then determines the current state of the air conditioner according to the initial state, the reference temperatures, the first temperature variation rate and the second temperature variation rate.

Figure 4:
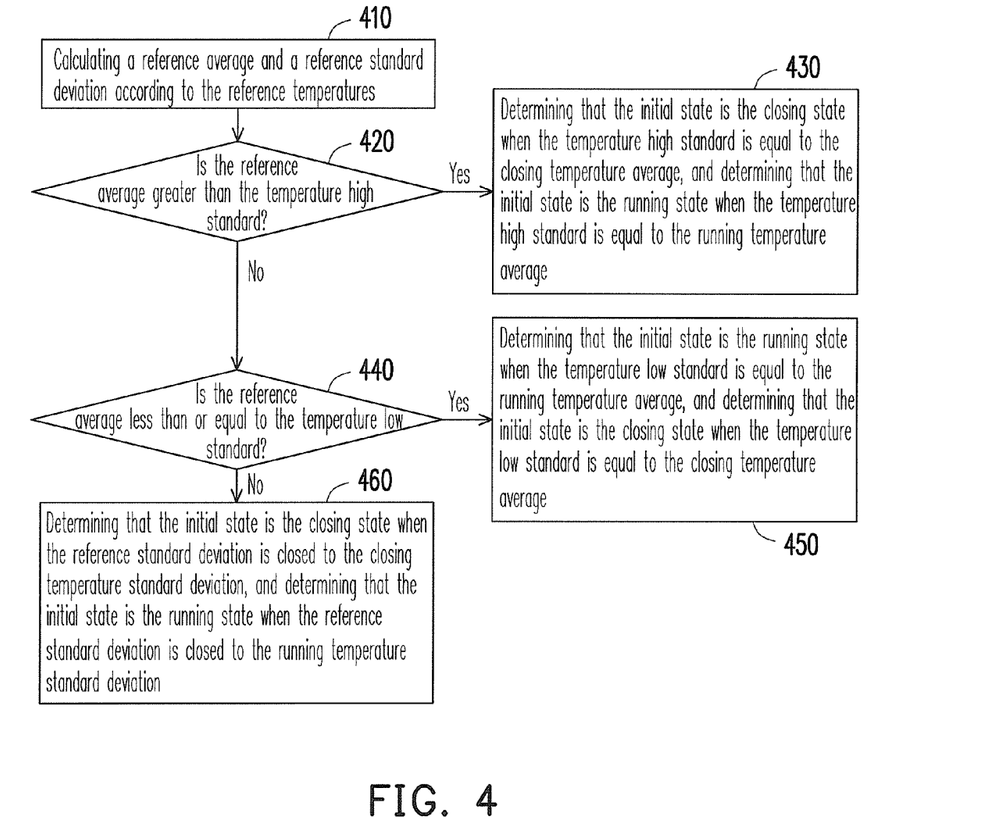
FIG. 4 is a flowchart illustrating a method for determining an initial state according to an embodiment of the present invention.

In detail, since the time for the operated air conditioner being in the closing transition state or the running transition state is relatively short, in the step 340, the estimating module 120 determines whether the initial state is the running state or the closing state. FIG. 4 is a flowchart illustrating a method for determining the initial state according to an embodiment of the present invention. First, in step 410, the estimating module 120 calculates a reference average and a reference standard deviation according to the reference temperatures newly detected by the first sensor device.

Next, in step 420, the estimating module 120 determines whether the reference average is greater than the temperature high standard. If the reference average is greater than the temperature high standard, in step 430, the estimating module 120 determines that the initial state is the closing state when the temperature high standard is equal to the closing temperature average, and determines that the initial state is the running state when the temperature high standard is equal to the running temperature average.

If the reference average is not greater than the temperature high standard, in step 440, the estimating module 120 determines whether the reference average is less than or equal to the temperature low standard, and if the reference average is less than or equal to the temperature low standard, in step 450, the estimating module 120 determines that the initial state is the running state when the temperature low standard is equal to the running temperature average, and determines that the initial state is the closing state when the temperature low standard is equal to the closing temperature average.

If the reference average is between the temperature high standard and the temperature low standard, in step 460, the estimating module 120 determines that the initial state is the closing state when the reference standard deviation is closed to the closing temperature standard deviation, and determines that the initial state is the running state when the reference standard deviation is closed to the running temperature standard deviation. For example, the estimating module 120 can calculate a difference between the reference standard deviation and the closing temperature standard deviation, and a difference between the reference standard deviation and the running temperature standard deviation, so as to determine the one that the reference standard deviation is closed to.

Figure 5:
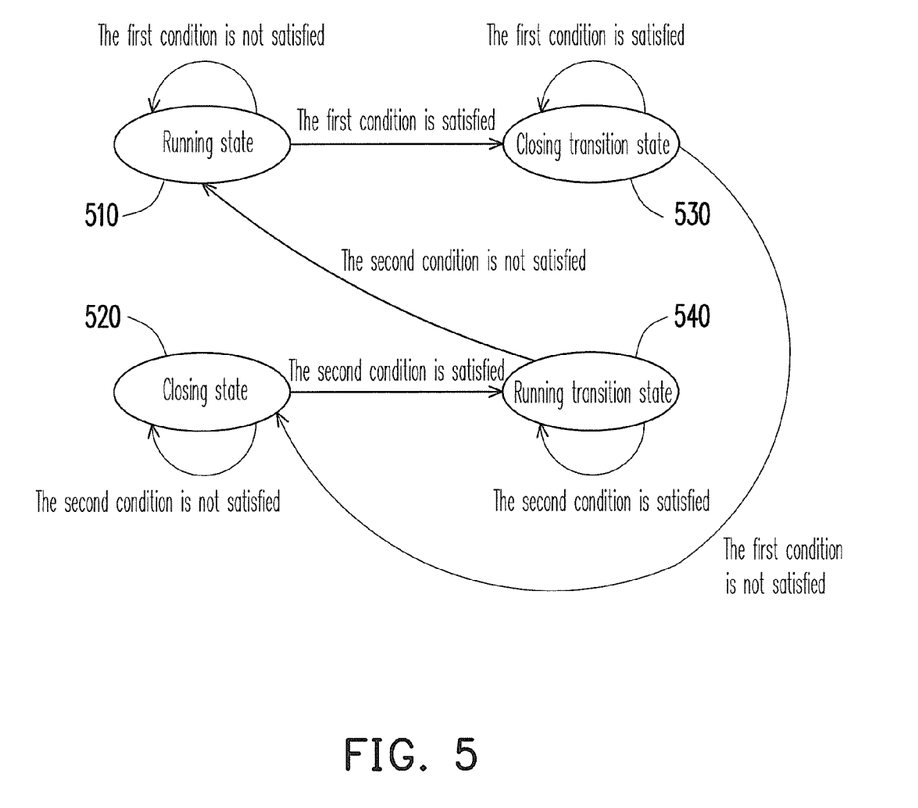
FIG. 5 is a state transfer diagram of a current state according to an embodiment of the present invention.

After the initial state is determined, the estimating module 120 determines the current state of the air conditioner according to a state machine principle. FIG. 5 is a state transfer diagram of the current state according to an embodiment of the present invention. Before the current state is determined, the estimating module 120 first calculates a reference variation rate according to the reference temperatures, and defines a first condition that the reference variation rate is greater than the first temperature variation rate and the first temperature variation rate is greater than 0, and further defines a second condition that the reference variation rate is greater than the second temperature variation rate and the second temperature variation rate is greater than 0.

As shown in FIG. 5, when the initial state or the current state is a running state 510, the estimating module 120 determines whether the first condition is satisfied. If the first condition is not satisfied, the estimating module 120 determines that the current state is maintained to the running state 510. However, if the first condition is satisfied, the estimating module 120 determines that the current state enters a closing transition state 530 from the running state 510.

When the initial state or the current state is a closing state 520, the estimating module 120 determines whether the second condition is satisfied. If the second condition is not satisfied, the estimating module 120 determines that the current state is maintained to the closing state 520. However, if the second condition is satisfied, the estimating module 120 determines that the current state enters a running transition state 540 from the closing state 520.

When the current state is the closing transition state 530, the estimating module 120 determines whether the first condition is satisfied. If the first condition is satisfied, the estimating module 120 determines that the current state is maintained to the closing transition state 530, and if the first condition is not satisfied, the estimating module 120 determines that the current state enters the closing state 520 from the closing transition state 530.

Moreover, when the current state is the running transition state 540, the estimating module 120 determines whether the second condition is satisfied. If the second condition is satisfied, the estimating module 120 determines that the current state is maintained to the running transition state 540, and if the second condition is not satisfied, the estimating module 120 determines that the current state enters the running state 510 from the running transition state 540.

According to the state transfer diagram of FIG. 5, after the estimating module 120 obtains the reference temperatures newly detected by the first sensor device, the estimating module 120 can determine whether the state of the air conditioner is changed and the state that the air conditioner is changed to according to the state of the air conditioner and whether the first condition or the second condition is satisfied.

Next, in step 350 of FIG. 3, the estimating module 120 selects a most suitable temperature transformation function from the temperature transformation functions established by the learning module 110 according to the current state of the air conditioner. In the present embodiment, the estimating module 120 selects the temperature transformation function corresponding to the current state according to the corresponding relationships respectively between the temperature transformation functions and the running state, the closing state, the closing transition state and the running transition state.

Finally, in step 360, the estimating module 120 estimates the current temperature of the test point according to the selected temperature transformation function and the reference temperatures. For example, the estimating module 120 inputs a latest reference temperature of the reference temperatures to the selected temperature transformation function, so as to achieve a purpose of estimating the current temperature of the test point according to the temperature detected by the first sensor device. In another embodiment, the temperature transformation functions established by the learning module 110 are table data. Therefore, the estimating module 120 can obtain a value corresponding to the latest reference temperature from the table to serve as the current temperature of the test point according to a table lookup method.

It should be noticed that in the present embodiment, though the air conditioner is assumed to be the air-cooling device, when a heater or another type of the air conditioner is deployed in the space, the temperature estimating apparatus 100 can also estimate the temperature of the test point according to the same or similar method of the present embodiment.

The present invention further provides a computer program product for executing the aforementioned method for estimating temperature. The computer program product comprises a plurality of program instructions (for example, a setting program instruction and a deployment program instruction, etc). These program instructions can be loaded into a computer system and executed by the same to complete foregoing steps in the method for estimating temperature, so that the computer system can act as a temperature estimating apparatus.

In summary, according to the present invention, in a learning stage, a plurality of the state parameters and a plurality of the temperature transformation functions corresponding to various states of the air conditioner are defined according to the reading values of the two sensor devices deployed on the ceiling and the test point. Then, in case that the sensor device deployed at the test point is removed, after the current state of the air conditioner is determined, the current temperature of the test point can be estimated according to the reading value of the sensor device deployed on the ceiling. Therefore, regarding a position in the space that is unsuitable for deploying a sensor device, a temperature thereof can also be estimated according to a reading value of a sensor device deployed at another place.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for estimating a temperature of a test point in a space with air conditioning, the method comprising:
    deploying a first sensor device and a second sensor device in the space, wherein the second sensor device is deployed at the test point;
    calculating a plurality of state parameters and establishing a plurality of temperature transformation formulas according to a plurality of temperatures detected by the first and the second sensor devices and states of an air conditioner during a predetermined time period, wherein the temperature transformation formulas respectively corresponds to one of said states of the air conditioner;
    removing the second sensor device;
    determining a current state of the air conditioner according to a plurality of reference temperatures newly detected by the first sensor device and the state parameters, wherein the current state is one of said states of the air conditioner;
    selecting a temperature transformation formula corresponding to the current state from the temperature transformation formulas; and
    estimating a current temperature of the test point by using the selected temperature transformation formula and the reference temperatures.

2. The method for estimating the temperature as claimed in claim 1, wherein said states of the air conditioner include a running state and a closing state,
    wherein the step of calculating the state parameters according to the temperatures detected by the first and the second sensor devices and the state of the air conditioner during the predetermined time period comprises:
    obtaining temperatures detected at the running state from the temperatures detected by the first and the second sensor devices, so as to calculate a running temperature average and a running temperature standard deviation;
    obtaining temperatures detected at the closing state from the temperatures detected by the first and the second sensor devices, so as to calculate a closing temperature average and a closing temperature standard deviation;
    defining one of the running temperature average and the closing temperature average as a temperature high standard;
    defining another one of the running temperature average and the closing temperature average as a temperature low standard; and
    taking the running temperature standard deviation, the closing temperature standard deviation, the temperature high standard and the temperature low standard as four of the state parameters.

3. The method for estimating the temperature as claimed in claim 2, wherein said states of the air conditioner further include a running transition state and a closing transition state, wherein the step of calculating the state parameters according to the temperatures detected by the first and the second sensor devices and the state of the air conditioner during the predetermined time period further comprises:

obtaining temperatures detected at the closing transition state from the temperatures detected by the first and the second sensor devices, so as to calculate a first temperature variation rate;

obtaining temperatures detected at the running transition state from the temperatures detected by the first and the second sensor devices, so as to calculate a second temperature variation rate; and taking the first temperature variation rate and the second temperature variation rate as two of the state parameters.

4. The method for estimating the temperature as claimed in claim 3, wherein the step of establishing the temperature transformation formulas according to the temperatures detected by the first and the second sensor devices and the state of the air conditioner during the predetermined time period comprises:

defining a function model of the temperature transformation formulas;

setting corresponding relationships respectively between the temperature transformation formulas and the running state, the closing state, the closing transition state and the running transition state;

obtaining the temperatures detected at the running state from the temperatures detected by the first and the second sensor devices, and inputting the temperatures detected at the running state to the function model to establish the temperature transformation formula corresponding to the running state;

obtaining the temperatures detected at the closing state from the temperatures detected by the first and the second sensor devices, and inputting the temperatures detected at the closing state to the function model to establish the temperature transformation formula corresponding to the closing state;

obtaining the temperatures detected at the closing transition state from the temperatures detected by the first and the second sensor devices, and inputting the temperatures detected at the closing transition state to the function model to establish the temperature transformation formulas corresponding to the closing transition state; and obtaining the temperatures detected at the running transition state from the temperatures detected by the first and the second sensor devices, and inputting the temperatures detected at the running transition state to the function model to establish the temperature transformation formulas corresponding to the running transition state.

5. The method for estimating the temperature as claimed in claim 3, wherein the step of determining the current state of the air conditioner according to the reference temperatures newly detected by the first sensor device and the state parameters comprises:

determining an initial state according to the reference temperatures, the temperature high standard, the temperature low standard, the running temperature standard deviation and the closing temperature standard deviation; and determining the current state according to the initial state, the reference temperatures, the first temperature variation rate and the second temperature variation rate.

6. The method for estimating the temperature as claimed in claim 5, wherein the step of determining the initial state according to the reference temperatures, the temperature high standard, the temperature low standard, the running temperature standard deviation and the closing temperature standard deviation comprises:

calculating a reference average and a reference standard deviation according to the reference temperatures;

determining the initial state to be the closing state when the temperature high standard is equal to the closing temperature average, and determining the initial state to be the running state when the temperature high standard is equal to the running temperature average if the reference average is greater than the temperature high standard;

determining the initial state to be the running state when the temperature low standard is equal to the running temperature average, and determining the initial state to be the closing state when the temperature low standard is equal to the closing temperature average if the reference average is less than or equal to the temperature low standard; and determining the initial state to be the closing state when the reference standard deviation is closed to the closing temperature standard deviation, and determining the initial state to be the running state when the reference standard deviation is closed to the running temperature standard deviation if the reference average is between the temperature high standard and the temperature low standard.

7. The method for estimating the temperature as claimed in claim 5, wherein before the step of determining the current state according to the initial state, the reference temperatures, the first temperature variation rate and the second temperature variation rate, the method further comprises:

calculating a reference variation rate according to the reference temperatures;

defining a first condition that the reference variation rate is greater than the first temperature variation rate and the first temperature variation rate is greater than 0; and defining a second condition that the reference variation rate is greater than the second temperature variation rate and the second temperature variation rate is greater than 0.

8. The method for estimating the temperature as claimed in claim 7, wherein the step of determining the current state according to the initial state, the reference temperatures, the first temperature variation rate and the second temperature variation rate further comprises:

determining whether the first condition is satisfied when the initial state or the current state is the running state, and determining the current state to be maintained to the running state if the first condition is not satisfied, and determining that the current state enters the closing transition state if the first condition is satisfied;

determining whether the second condition is satisfied when the initial state or the current state is the closing state, and determining the current state to be maintained to the closing state if the second condition is not satisfied, and determining that the current state enters the running transition state if the second condition is satisfied;

determining whether the first condition is satisfied when the current state is the closing transition state, and determining the current state to be maintained to the closing transition state if the first condition is satisfied, and determining that the current state enters the closing state if the first condition is not satisfied; and determining whether the second condition is satisfied when the current state is the running transition state, and determining the current state to be maintained to the running transition state if the second condition is satisfied, and determining that the current state enters the running state if the second condition is not satisfied.

9. The method for estimating the temperature as claimed in claim 3, wherein the step of selecting one of the temperature transformation formulas according to the current state comprises:

selecting the temperature transformation formula corresponding to the current state according to the corresponding relationships respectively between the temperature transformation formulas and the running state, the closing state, the closing transition state and the running transition state.

10. The method for estimating the temperature as claimed in claim 1, wherein the step of estimating the current temperature of the test point according to the selected temperature transformation formula and the reference temperatures comprises:

inputting a latest reference temperature of the reference temperatures to the selected temperature transformation formula to obtain the current temperature.

11. The method for estimating the temperature as claimed in claim 1, wherein the second sensor device comprises one or a plurality of sensors.

12. A temperature estimating apparatus, comprising:

a processor chip;

a memory storing a plurality of program instructions, wherein the processor performs the program instructions to:

calculate a plurality of state parameters and establishing a plurality of temperature transformation formulas according to a plurality of temperatures detected by a first and a second sensor devices deployed in a space and states of an air conditioner during a predetermined time period, wherein the second sensor device is deployed at a test point in the space; and determine a current state of the air conditioner according to a plurality of reference temperatures newly detected by the first sensor device and the state parameters, select a temperature transformation formula corresponding to the current state from the temperature transformation formulas, and estimate a current temperature of the test point according to the selected temperature transformation formula and the reference temperatures, wherein the current state is one of said states of the air conditioner.

13. The temperature estimating apparatus as claimed in claim 12, wherein said states of the air conditioner include a running state and a closing state, wherein the step of calculating the state parameters according to the temperatures detected by the first and the second sensor devices and the state of the air conditioner during the predetermined time period comprises:

obtaining temperatures detected at the running state from the temperatures detected by the first and the second sensor devices, so as to calculate a running temperature average and a running temperature standard deviation;

obtaining temperatures detected at the closing state from the temperatures detected by the first and the second sensor devices, so as to calculate a closing temperature average and a closing temperature standard deviation;

defining one of the running temperature average and the closing temperature average as a temperature high standard;

defining another one of the running temperature average and the closing temperature average as a temperature low standard; and taking the running temperature standard deviation, the closing temperature standard deviation, the temperature high standard and the temperature low standard as four of the state parameters.

14. The temperature estimating apparatus as claimed in claim 13, wherein said states of the air conditioner further include a running transition state and a closing transition state, wherein the step of calculating the state parameters according to the temperatures detected by the first and the second sensor devices and the state of the air conditioner during the predetermined time period further comprises:

obtaining temperatures detected at the closing transition state from the temperatures detected by the first and the second sensor devices, so as to calculate a first temperature variation rate;

obtaining temperatures detected at the running transition state from the temperatures detected by the first and the second sensor devices, so as to calculate a second temperature variation rate; and taking the first temperature variation rate and the second temperature variation rate as two of the state parameters.

15. The temperature estimating apparatus as claimed in claim 14, wherein the step of establishing the temperature transformation formulas according to the temperatures detected by the first and the second sensor devices and the state of the air conditioner during the predetermined time period comprises:

defining a function model of the temperature transformation formulas;

setting corresponding relationships respectively between the temperature transformation formulas and the running state, the closing state, the closing transition state and the running transition state;

obtaining the temperatures detected at the running state from the temperatures detected by the first and the second sensor devices, and inputting the temperatures detected at the running state to the function model to establish the temperature transformation formula corresponding to the running state;

obtaining the temperatures detected at the closing state from the temperatures detected by the first and the second sensor devices, and inputting the temperatures detected at the closing state to the function model to establish the temperature transformation formula corresponding to the closing state;

obtaining the temperatures detected at the closing transition state from the temperatures detected by the first and the second sensor devices, and inputting the temperatures detected at the closing transition state to the function model to establish the temperature transformation formulas corresponding to the closing transition state; and obtaining the temperatures detected at the running transition state from the temperatures detected by the first and the second sensor devices, and inputting the temperatures detected at the running transition state to the function model to establish the temperature transformation formulas corresponding to the running transition state.

16. The temperature estimating apparatus as claimed in claim 14,
   wherein the step of determining the current state of the air conditioner according to the reference temperatures newly detected by the first sensor device and the state parameters comprises:
   determining an initial state according to the reference temperatures, the temperature high standard, the temperature low standard, the running temperature standard deviation and the closing temperature standard deviation; and
   determining the current state according to the initial state, the reference temperatures, the first temperature variation rate and the second temperature variation rate.

17. The temperature estimating apparatus as claimed in claim 16,
   wherein the step of determining the initial state according to the reference temperatures, the temperature high standard, the temperature low standard, the running temperature standard deviation and the closing temperature standard deviation comprises:
   calculating a reference average and a reference standard deviation according to the reference temperatures;
   determining the initial state to be the closing state when the temperature high standard is equal to the closing temperature average, and determining the initial state to be the running state when the temperature high standard is equal to the running temperature average if the reference average is greater than the temperature high standard;
   determining the initial state to be the running state when the temperature low standard is equal to the running temperature average, and determining the initial state to be the closing state when the temperature low standard is equal to the closing temperature average if the reference average is less than or equal to the temperature low standard; and
   determining the initial state to be the closing state when the reference standard deviation is closed to the closing temperature standard deviation, and determining the initial state to be the running state when the reference standard deviation is closed to the running temperature standard deviation if the reference average is between the temperature high standard and the temperature low standard.

18. The temperature estimating apparatus as claimed in claim 16,
   wherein before the step of determining the current state according to the initial state, the reference temperatures, the first temperature variation rate and the second temperature variation rate, the method further comprises:
   calculating a reference variation rate according to the reference temperatures;
   defining a first condition that the reference variation rate is greater than the first temperature variation rate and the first temperature variation rate is greater than 0; and
   defining a second condition that the reference variation rate is greater than the second temperature variation rate and the second temperature variation rate is greater than 0.

19. The temperature estimating apparatus as claimed in claim 18,
   wherein the step of determining the current state according to the initial state, the reference temperatures, the first temperature variation rate and the second temperature variation rate further comprises:
   determining whether the first condition is satisfied when the initial state or the current state is the running state, and determining the current state to be maintained to the running state if the first condition is not satisfied, and determining that the current state enters the closing transition state if the first condition is satisfied;
   determining whether the second condition is satisfied when the initial state or the current state is the closing state, and determining the current state to be maintained to the closing state if the second condition is not satisfied, and determining that the current state enters the running transition state if the second condition is satisfied;
   determining whether the first condition is satisfied when the current state is the closing transition state, and determining the current state to be maintained to the closing transition state if the first condition is satisfied, and determining that the current state enters the closing state if the first condition is not satisfied; and
   determining whether the second condition is satisfied when the current state is the running transition state, and determining the current state to be maintained to the running transition state if the second condition is satisfied, and determining that the current state enters the running state if the second condition is not satisfied.

20. The temperature estimating apparatus as claimed in claim 14,
   wherein the step of selecting one of the temperature transformation formulas according to the current state comprises:
   selecting the temperature transformation formula corresponding to the current state according to the corresponding relationships respectively between the temperature transformation formulas and the running state, the closing state, the closing transition state and the running transition state.

21. The temperature estimating apparatus as claimed in claim 12,
   wherein the step of estimating the current temperature of the test point according to the selected temperature transformation formula and the reference temperatures comprises:
   inputting a latest reference temperature of the reference temperatures to the selected temperature transformation formula to obtain the current temperature.

22. The temperature estimating apparatus as claimed in claim 12, wherein the second sensor device includes one or a plurality of sensors.

* * * * *